Aug. 23, 1960           J. L. FISHER           2,950,121
STEERING MECHANISM FOR MICROPHONE DOLLY AND THE LIKE
Filed Sept. 29, 1958           2 Sheets-Sheet 1
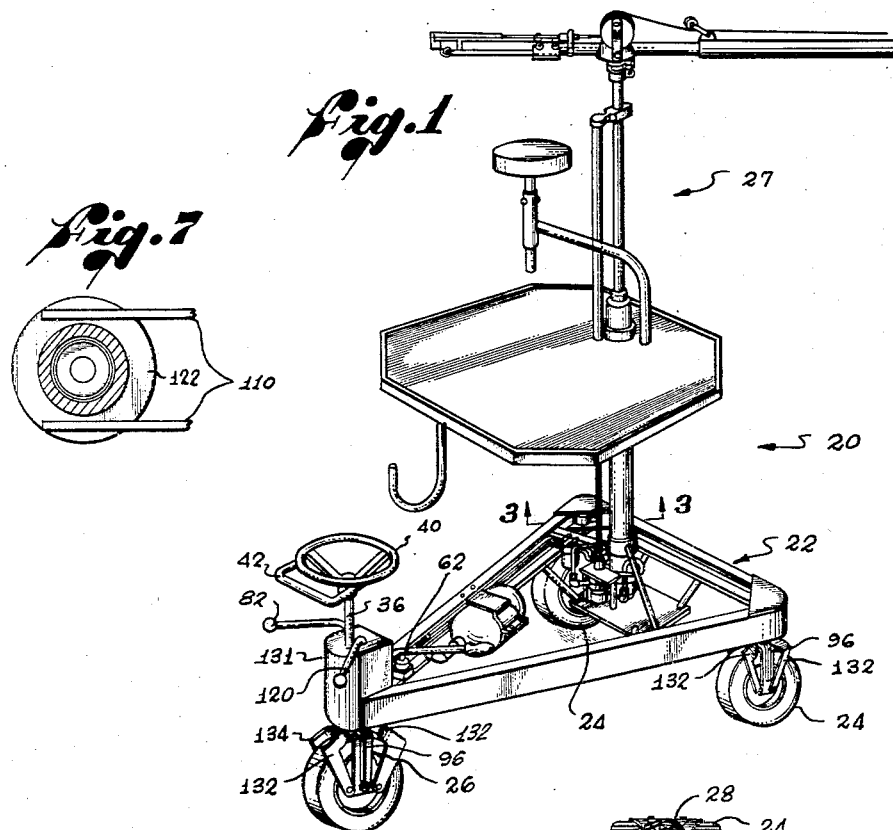
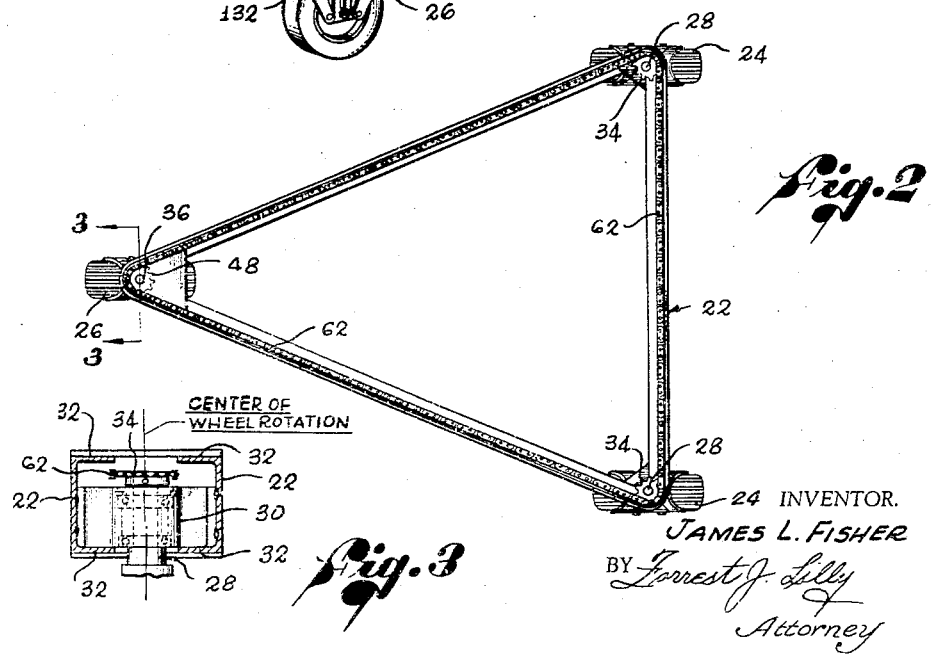
INVENTOR.
JAMES L. FISHER
BY Forrest J. Lilly
Attorney

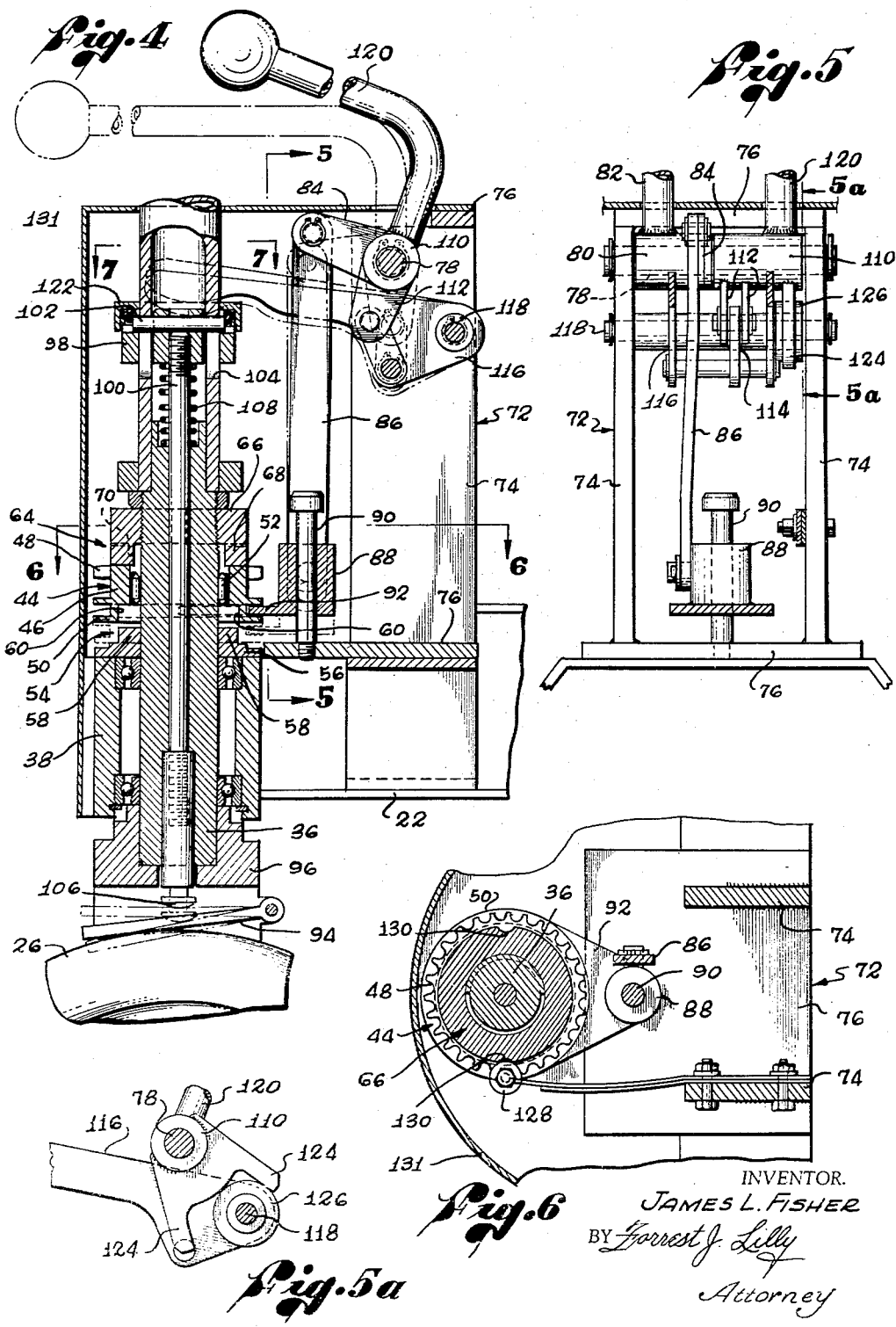

United States Patent Office 2,950,121
Patented Aug. 23, 1960

2,950,121

STEERING MECHANISM FOR MICROPHONE DOLLY AND THE LIKE

James L. Fisher, 3981 Weslin Ave., Sherman Oaks, Calif.

Filed Sept. 29, 1958, Ser. No. 764,187

5 Claims. (Cl. 280—47.11)

This invention relates generally to dollies which are used in the motion picture and television fields as movable supports for certain types of equipment, such as microphone booms. The invention deals more particularly with an improved steering mechanism for such dollies.

Microphone dollies and the like must be capable of so-called "square steering," as well as curved steering. "Square steering" is achieved by simultaneously turning all of the wheels of the dolly in such a way that the axes of the wheels remain parallel. Movement of the dolly during "square steering" is, therefore, along a straight line. This straight line movement may be in any forward, reverse, oblique or transverse direction, depending on the angular position to which the wheels are turned.

One mode of curved steering is referred to in the art as "half O" steering. Strictly speaking, "half O" steering of a four wheeled dolly by simultaneously turning its two rear wheels in such a way that their axes intersect at a center. The two front wheels are locked in coaxial, straightforward positions. In the present application, however, the expression "half O" steering will be used to connote steering of a three-wheeled dolly by turning its rear wheel with its two front wheels locked in coaxial position.

A general object of the invention is the provision of an improved steering mechanism for microphone dollies and the like.

A more specific object is the provision of a steering mechanism of the character described, capable of effecting both square and half O steering of a microphone dolly or the like.

Another object is the provision of a steering mechanism of the character described which embodies an improved and simplified clutching action for shifting between square and half O steering, as well as a simple brake mechanism for braking the dolly against movement.

A further object is the provision of a steering mechanism of the character described which is simple in construction, relatively inexpensive to manufacture, and otherwise well suited to its intended function.

Other objects, advantages and features of the invention will become readily apparent as the description proceeds.

Briefly, these objects are attained by the provision of a dolly equipped with turnable front and rear wheels. The present illustrative dolly is a three-wheeled structure having one rear wheel, mounted on the lower end of a steering post, and two front wheels.

The two front wheels are steered through a sprocket chain drive including an axially shiftable sprocket on the steering post. In half O steering, this sprocket is shifted into clutching engagement with the frame, to lock the front wheels in coaxial position while permitting steering of the rear wheel by turning of the steering post. In square steering, the sprocket is shifted into clutching engagement with the post to lock all of the wheels together for simultaneous steering by turning of the steering post.

Also mounted on the post is a simple brake mechanism for braking the rear wheel.

The invention may be better understood from the following detailed description thereof taken in connection with the attached drawings, wherein:

Fig. 1 is a perspective view of the present dolly;

Fig. 2 is an enlarged top plan view of the frame of the dolly;

Fig. 3 is an enlarged section taken along line 3—3 of Fig. 2;

Fig. 4 is an enlarged section through the steering and brake mechanism of the dolly;

Fig. 5 is a section taken along line 5—5 of Fig. 4;

Fig. 5a is a section taken along line 5a—5a of Fig. 5;

Fig. 6 is a section taken along line 6—6 of Fig. 4; and

Fig. 7 is a section taken along line 7—7 of Fig. 4.

Referring now to these drawings, the numeral 20 denotes the dolly of the invention. This dolly includes a generally triangular frame 22 having a pair of front wheels 24 and a rear wheel 26. The wheels are located at the three corners of the frame, as shown. Frame 22 illustratively mounts a microphone support 27. The dolly may, of course, be used to support other types of equipment.

Front wheels 24 are rotatably mounted on the lower ends of vertical wheel supporting member or shafts 28. The upper ends of these shafts are journalled in bearing units 30. These units are mounted on the frame 22 between horizontal flanges 32 thereof. Fixed to the upper extremity of each shaft 28 is a sprocket 34.

Rear wheel 26 is rotatably mounted on the lower end of a vertical steering post 36. Post 36 is journalled in a bearing unit 38 on the frame 22 and extends a distance above the frame. For facility of manufacture and assembly, this post may comprise a series of rigidly connected sections, as shown.

Fixed to the upper end of the steering post is a steering wheel 40 by which the post may be turned. A handle bar 42, secured to the underside of the steering wheel, affords an alternative means for turning the post.

Slidably and rotatably received on the steering post, approximately in the plane of the front sprockets 34, is a shiftable rear sprocket unit 44. This unit consists of a sleeve 46 mounting an integral sprocket 48 and a circumferentially grooved clutch collar 50. Sleeve 46 is supported, by bearings 52, for axial shifting on the post 36 between the upper solid line position of Fig. 4 and the lower phantom line position of that figure.

Generally indicated at 54 are clutch means which are engageable, upon shifting of the sprocket unit to its lower position, to lock the unit against turning relative to the frame 22. This clutch means comprises an annular clutch member 56 secured to the upper end of the rear bearing unit 38 and having a pair of diametrically opposed lugs 58 engageable in a pair of diametrically opposed slots 60 in the lower end of the sprocket unit 44 when the latter is in its lower position. It will be observed that the clutch means 54 may be engaged only when the sprocket unit is turned to the angular position shown in Fig. 4 or to a position 180 degrees from the illustrated position.

Trained about the two front sprockets 34 and the rear sprocket 48 is a sprocket chain 62. The sprockets are so oriented that when the clutch means 54 are engaged, the front wheels 24 are in coaxial, straightforward positions. With the clutch means 54 engaged, of course, the front wheels are locked against turning from their coaxial position.

Generally indicated at 64 are second clutch means which are engageable by shifting of the sprocket unit to its upper position. This clutch means locks the sprocket unit to the steering post 36 for turning with the latter. This second clutch means comprises an annular clutch member 66 fixed to the post and having diametrically opposed lugs 68. These lugs are engageable in diametrically opposed slots 70 in the upper end of the sprocket unit when the latter is in its upper position of Fig. 4.

As in the case of the lower clutch means 54, it will be observed that the upper clutch means 64 may be engaged only when the sprocket unit is in its angular position of Fig. 4 relative to the steering post or a position spaced 180° from that illustrated. In these relative positions, the axes of the three dolly wheels are parallel.

From the description thus far, it will be seen that when the sprocket unit is shifted to its lower position to engage the lower clutch means 54, the front wheels 24 are locked in straight forward position while the rear wheel 26 is free to be turned by the steering wheel 40. In the lower position of the sprocket unit then, the steering mechanism is set for "half O" steering.

When the sprocket unit is shifted to its upper position, on the other hand, to engage the upper clutch means 64, the three wheels are locked together for simultaneous turning by the steering wheel in such a way that their axes remain parallel. In the upper position of the sprocket unit then, the steering mechanism is set for "square" steering.

The sprocket unit is shifted between these positions, as follows. Rigid on the frame 22, forwardly of the steering post, is an upstanding support 72. This support has a pair of vertical side plates 74 which are joined by cross plates 76. Extending between the upper ends of the side plates 74 is a shaft 78 on which is journalled a hub 80. A handle 82 is fixed to this hub for turning the latter on the shaft 78.

Extending radially from the hub is an arm 84, the free end of which is pivotally attached to the upper end of a vertical link 86. The lower end of the link 86 is pivoted to a sleeve 88. This sleeve is vertically slidable on a bolt 90, fixed to the lower cross plate 76. Integrally formed on the sleeve 88 is a fork 92, the arms of which are slidably engaged in the peripheral groove of the clutch collar 50.

It will be apparent, therefore, that the sprocket unit 44 may be shifted between its upper and lower positions by swinging of the clutching handle 82.

At times it is desirable to brake the dolly against movement. To this end, a brake plate 94 is hingeably mounted between the arms of a fork 96 on the lower end of the steering post 36. This fork journals the rear wheel 26. Brake plate 94 is swingable against the wheel to brake the latter against turning.

The means for operating the brake plate comprise a collar 98, slidable on the steering post 36 above the upper clutch member 66. This collar is connected to a brake actuating rod 100, axially slidable in the steering post, by means of a pin 102. Pin 102 is fixed to the collar 98 and etxends slidably through a longitudinal slot 104 in the post.

The lower end of the brake rod 100 is rounded, as shown at 106, for rockable engagement with the brake plate 94. When the collar 98 is moved downwardly on the steering post, this rounded end of the brake rod presses against the brake plate to urge the latter against the rear wheel. A coil spring 108 biases the brake rod upwardly to relieve the pressure on the brake plate 94.

The collar 98 is operated to apply the brake as follows. Journalled on the shaft 78, on the support 72, is a second hub 110. Fixed to this hub is a pair of spaced radial arms 112 between the free ends of which is pivoted a short link 114. The free end of the link 114, in turn, is pivoted to a yoke 116. This yoke is journalled at its forward end on a shaft 118 fixed between the side plates 74 of the support 72.

The arms of the yoke 116 straddle the steering post 36 above the collar 98. When the hub 110 is turned in a counterclockwise direction (Fig. 4) by means of a handle 120 fixed to the hub, the yoke 116 is rocked in a counterclockwise direction through the arm and link connection 112, 114, between the hub and yoke. The arms of the yoke are thereby pressed against a rotatable cap 122 on the collar 98 to force the latter downwardly against the action of the spring 108. This, of course, applies the brake.

It will be observed in Fig. 4 that the arm 112 and link 114 form a toggle linkage which moves past dead center to lock the brake in its "on" position. Turning of the hub 110 in opposite directions is limited by means of a pair of stop arms 124 fixed to the hub and engageable with a nylon collar 126 on the shaft 118.

Indicated at 128 is a yieldable roller detent which is engageable in a pair of diametrically opposed recesses 130 in the clutch member 66 to indicate to the operator when the steering post is turned to a position wherein the rear wheel is in a straight fore and aft position. The steering mechanism is enclosed by a cover 131.

Hingeably supported on each wheel supporting fork 96 are a pair of cable guards 132. These guards have generally semi-cylindric end portions 134 and are swingable to locate these end portions just above the floor. In this lower position of the guards, they serve to move electrical cables and the like on the floor clear of the wheels as the dolly is moved from one position to another.

Operation of the steering mechanism is obvious from the foregoing description. Thus, shifting between half O and square steering is simply accomplished by moving the handle 82 up-and-down to shift the clutch unit 44 between its upper and lower positions.

In the lower position of the unit, the front wheels 24 are locked in coaxial position while the rear wheel 26 is free to be turned by the steering wheel 40. In the upper position of the clutch unit, the front and rear wheels are locked together for simultaneous turning by the wheel 40 in such a way that the wheel axes remain parallel.

Similarly, the brake on the dolly may be selectively applied and released by moving the handle 120 up and down.

It will be apparent, therefore, that there has been described and illustrated a wheel steering and brake mechanism for microphone dollies and the like which is fully capable of attaining the objects preliminarily set forth.

While a preferred embodiment of the invention has been disclosed for illustrative purposes, numerous modifications in design and arrangement of parts of the invention are possible within the scope of the following claims.

I claim:

1. In a dolly of the character described, a frame, a pair of wheel supporting members rotatably mounted on one end of the frame for turning on parallel axes, first frame supporting wheels mounted on said members, a steering post rotatably mounted on the other end of the frame for turning on an axis parallel to said first-mentioned axes, a second frame supporting wheel at said other end of said frame, means connecting said steering post and second wheel for steering of the latter by turning of said post, a first sprocket coaxially fixed to each of said members, a second sprocket rotatable on and slidable along said post, first cooperating clutch means on said frame and second sprocket for locking the latter against rotation relative to the frame upon shifting of the second sprocket to one axial position on the post, second cooperating clutch means on said post and second sprocket for locking the latter against rotation on the post upon shifting of the second sprocket to another axial position on the post, means for shifting the second sprocket between said positions, and a sprocket chain trained about said sprockets.

2. The subject matter of claim 1 including cooperating spring-loaded detent means on the frame and post which engage to produce an indication when the post is turned to a position wherein said second wheel is located in a longitudinal plane of the dolly.

3. The subject matter of claim 1 wherein said means for shifting the second sprocket on the post comprises a sprocket-shifting fork rotatably engaged with the second sprocket, means slidably mounting said fork on the frame for movement parallel to the post, a clutch handle on the frame, and a link connecting said clutch handle and fork for movement of the latter to shift the second sprocket by movement of said clutch handle.

4. In a dolly of the character described, a normally horizontal frame, a pair of wheel supporting members rotatably mounted on one end of the frame for turning on parallel, normally vertical axes, first frame supporting wheels on said members, a steering post rotatably mounted on the other end of the frame for turning on an axis parallel to said first-mentioned axes, said post extending a distance above said frame, means on the upper end of said post by which it may be turned, a first sprocket fixed to each wheel supporting member, a second sprocket slidable and rotatable on the upper end of said post, first cooperating clutch teeth on the underside of said second sprocket and on the upper side of the frame about the post which are engageable to lock the second sprocket against turning relative to the frame upon downward shifting of the second sprocket to a first position on the post, second cooperating clutch teeth on the upper side of the second sprocket and on the post above the second sprocket which are engageable to lock the second sprocket against turning on the post upon upward shifting of the second sprocket to a second position on the post, means to shift said second sprocket between said positions, and a sprocket chain trained about said sprockets.

5. In a dolly of the character described, a normally horizontal frame, a pair of wheel supporting members rotatably mounted on one end of the frame for turning on parallel, normally vertical axes, first frame supporting wheels on said members, a steering post rotatably mounted on the other end of the frame for turning on an axis parallel to said first-mentioned axes, said post extending a distance above said frame, means on the upper end of the post by which it may be turned, a first sprocket fixed to each wheel supporting member, a second sprocket slidable and rotatable on the upper end of said post, first cooperating clutch teeth on the underside of said second sprocket and on the upper side of the frame about the post which are engageable to lock the second sprocket against turning relative to the frame upon downward shifting of the second sprocket to a first position on the post, second cooperating clutch teeth on the upper side of the second sprocket and on the post above the second sprocket which are engageable to lock the second sprocket against turning on the post upon upward shifting of the second sprocket to a second position on the post, a sprocket chain trained about said sprockets, a brake for the wheel at said other end of the frame including a brake rod slidable in the post and movable in one direction in the post to apply the brake, a collar slidable on the post and connected with the brake rod through slots in the post, a support on the frame adjacent the post, a brake handle and a clutch handle on said support, means operated by said brake handle and engageable with said collar for shifting of the rod by movement of the brake handle, and means connecting the clutch handle and second sprocket for shifting of the latter on the post by movement of the clutch handle.

References Cited in the file of this patent

UNITED STATES PATENTS

| | | |
|---|---|---|
| 2,388,692 | House | Nov. 13, 1945 |
| 2,470,496 | Krilanovich | May 17, 1949 |
| 2,661,672 | Fairbanks | Dec. 8, 1953 |